Patented May 9, 1950

2,507,013

UNITED STATES PATENT OFFICE 2,507,013

FROTH FLOTATION OF CALCITE CONTAINING DOLOMITE OR MAGNESITE

Thorbjorn Heilmann, Copenhagen, Denmark, assignor to Separation Process Company, Catasauqua, Pa., a corporation of Delaware No Drawing. Application March 5, 1947, Serial No. 732,652. In Denmark March 9, 1946

12 Claims. (Cl. 209—166)

This invention relates to the beneficiation by froth flotation of ores relatively rich in calcite containing an undesirable proportion of magnesium carbonate in the form of magnesite ($MgCO_3$) or dolomite ($CaCO_3.MgCO_3$). More particularly, the invention relates to the removal as a froth concentrate of magnesite or dolomite from calcite and siliceous materials, and when further enrichment of the calcite is desired, includes the subsequent processing of the flotation residue to produce a higher grade calcite product with good weight recovery. The process of the invention is of particular importance in the production of hydraulic and burnt lime, and in the treatment of cement raw materials to produce mixtures having reduced magnesium carbonate content which are suitable for use in the production of modern cements of predetermined compound compositions.

Various methods of beneficiating magnesite ores containing relatively minor proportions of calcite have heretofore been proposed and operated. These methods have involved the production of a magnesite of high purity by froth flotation using fatty acids and soaps thereof in the presence of such conditioning agents as sodium silicate, pyrophosphates, and acid salts. It has not been possible, however, by such methods to attain a satisfactory selectivity in cases where it has been desired to produce a high grade calcite from a raw material relatively rich in calcite and containing also undesirable proportions of magnesite or dolomite.

In the manufacture of Portland cement from many types of natural raw materials unsuitable for direct use, it is possible by a subtractive treatment to remove an undesired mineral or to so separate the various components that they may be recombined to give satisfactory raw material mixtures for burning in a kiln to produce the various present day types of Portland cement. Such treatments, including froth flotation as one method of separation, were originally proposed by Charles H. Breerwood in U. S. Patent No. 1,931,921. Since then, a number of further methods of treatment have been developed by him and others, some of which included froth flotation. Magnesia in quantities above a maximum limit is an undesirable component of a cement raw material mixture, because a negligible proportion enters into chemical combination during the burning process and a major part of such magnesia appears in the clinker in the form of periclase, a compound which causes delayed expansion and ultimate disintegration of concrete.

Magnesia generally occurs in cement rock in the form of silicates, such as for example mica, and as carbonates, usually magnesite or dolomite, the latter being a double calcium magnesium carbonate. Methods of processing to reduce excessive magnesia content when present in the first mentioned form have proved successful in plant practice, but no satisfactory method involving froth flotation has, to my knowledge, been proposed for a satisfactory reduction of the magnesia content when present in excessive amounts in the form of carbonates. In general, it may be said that, in spite of improved clinker quenching methods, cement rocks are not desirable as components of a cement raw material mix if they contain $MgCO_3$ in excess of about 4.5%. There are vast deposits of rock throughout the world containing substantial proportions of calcite which are now not suitable for use in cement making or for other purposes, such as the production of hydraulic or burnt lime, because of the fact that they contain a proportion of magnesite or dolomite in excess of this figure.

The present invention is accordingly directed to the provision of a froth flotation method whereby a high grade calcite product may be obtained from a material relatively rich in calcite but containing an undesirable proportion of magnesite or dolomite. In accordance with the process of the invention, the material having an appropriate particle size and in the form of an aqueous pulp is conditioned in the presence of a relatively small proportion of at least one hydraulic calcium silicate, such as Portland cement, following which the magnesite or dolomite is froth floated from a pulp having a pH value in excess of about 8.5, by means of organic anionic active collector compounds containing acid groups, such as, for example, fatty acids or resin acids or mixtures thereof, or soluble soaps of such reagents.

In carrying out my process on some materials, improved selectivity will frequently be effected by a preliminary removal from the material of a fine fraction of low micron particle size. In many flotation operations it has been found essential to "deslime" the material prior to flotation. In the present instance, however, a size classification frequently found to be of advantage, is not such an operation in the ordinary sense of the term, since a major proportion of the material, after suitable grinding to produce the substantial release of the mineral bonds, is within the usually defined limits of "slimes." In carrying out such a preferred procedure, a relatively small proportion by weight of material having a particle size in the low micron range, for example below 10 microns, is removed by means of a physical separation process conducted in settling apparatus, either dry or wet. A particularly satisfactory method involves the continuous treatment of an aqueous slurry in a centrifugal separator. The particle size split and weight percentage of finest material removed will vary according to the properties of the material being treated.

The collector reagents suitable for selectively floating the magnesite and the dolomite from the calcite in accordance with the invention may be any of the well known anionic types of organic acids now employed in the flotation of oxide ore minerals. Various higher fatty acids or mixtures thereof derived from animal and vegetable oils are in most cases available to the operator and give satisfactory results. I have also found that the alkali metal soaps of such acids or acid mixtures are effective. In many instances, a cheaper reagent may be desirable and in such cases a soap of "waste oil" produced in the refining of animal and vegetable oils during the production of high grade fatty acids will prove satisfactory. Furthermore the soaps of resinous acids may be used with advantage either alone or in a mixture with other types of soap.

In the flotation of non-metallic minerals with anionic active collectors, it has been observed that relatively strong alkaline pulps are undesirable since they tend to produce a barren overly soapy froth. In operating the process of my invention, however, I desire to produce in the pulp an alkalinity in excess of a pH value of 8.5 and preferably between about 9.0 and 11.0. This is in excess of any value normally attained by the addition of the usual conditioning or dispersing reagents of the alkaline type. According to the invention, such high pH regulation is accomplished in one of two ways. Depending on the properties of the material being beneficiated, the amount of hydraulic calcium silicate found desirable will vary. In some instances particularly when Portland cement is the conditioning agent used, the alkalinity of the conditioned pulp will be sufficiently high to cause a satisfactory magnesia separation, and no further addition of alkaline material will be required. In other cases, however, usually when certain slags are employed the high pH regulation may be effected by the addition to the pulp of a soluble alkaline material such as an oxide, hydroxide, or bicarbonate of an alkali or alkaline earth metal. Quick lime, hydrated lime, sodium hydroxide and potassium hydroxide are examples of suitable materials. Other alkaline salts, sodium bicarbonate, ammonium bicarbonate, or calcium bicarbonate, a small proportion of which is normally present in hard water, may be used alone or preferably in combination with oxides or hydroxides. For example, I have found that in some instances results have been considerably improved by the presence of a soluble bicarbonate in an amount in excess of 0.1 gram per liter.

The silicate conditioning agent of my process may be any calcium silicate containing material which, due to hydration or hydrolysis, will produce a substantial concentration of silicate ions. A material such as Portland cement which contains a variety of silicate compounds resulting from the high temperature treatment of a raw material mixture including substances which when heated produce $CaO$, $Al_2O_3$ and $SiO_2$, is particularly suited to the process. Slags resulting from numerous furnace and smelting operations, as well as certain natural cements, are also effective in the process. As previously indicated, some of the silicates suitable for use in the invention produce a substantial increase in the pH of the pulp, and no further alkaline material is required. Portland cement when used in relatively small quantities is such a material. Due to the fact that the reagents which are contemplated for use in connection with my invention, are effective because of reaction with water thereon, to produce a hydration or hydrolysis, I have referred to them herein as "hydraulic calcium silicates." By the use of the term "hydraulic" I do not mean to imply that I consider a "setting" phenomenon to be involved. As previously stated, the amount of calcium silicate material required will vary according to the silicate used and the material being beneficiated. In general, quantities within the range 2–20 lbs. per ton of dry material to be floated, will be most satisfactory, with 5–10 lbs. per ton being most successful if Portland cement is the calcium silicate material used. It will be apparent that the use of such a low priced commodity as cement or slag as a conditioning agent will be responsible for marked economies in the flotation reagent cost.

In many instances the tailing from the magnesite or dolomite flotation will contain appreciable amounts of silica, silicate or other undesired minerals, and it will be an advantage to further raise the grade of the calcite product. This may be done in accordance with a further embodiment of the invention by reducing the pH of the pulp to a point below about 8.5, and froth floating the calcite in a well known manner with anionic calcite collectors. These will in general be organic acids such as fatty acids or resin acids or mixtures of the two, such for example as tall oil. Soaps of these acids or acid mixtures are also of great value in many instances.

In an alternative procedure in accordance with the invention, a method is provided which will be of particular advantage in beneficiating for the preparation of an ultimate cement raw material mixture, cement raw materials which contain both magnesium carbonate and siliceous materials in excess of that desired in the ultimate mixture. In accordance with this procedure the magnesite or dolomite is selectively removed by the above described treatment, and the tailing then treated with a cationic reagent to remove the undesired proportion of siliceous material. In the event that the siliceous portion of the raw material is composed of free silica ($SiO_2$), and a silicate in the form of a mica, the mica may be selectively removed by means of a cationic reagent, preferably in the presence of a soluble iron or aluminum salt such as aluminum chloride, thus leaving as a final tailing the calcite and silica both of which will be required in the ultimate mixture fed to the kiln.

In the case of certain other materials containing appreciable amounts of silica or silicate minerals, it may be desirable to carry out the process of the invention by a slightly modified procedure. The magnesite or dolomite and the calcite may, for example, be removed as combined concentrate by known anionic flotation treatment. The magnesium carbonate may then be separated from the calcite by further flotation in accordance with the above described procedure involving an increase in the pH value and the addition of the herein described reagents. In another modification of the process of the invention, the treatment may consist in submitting the material to a cationic flotation in order to remove siliceous components and thereafter treating the tailing to separate the magnesium carbonate from the calcite in accordance with the described method.

The referred to reduction of the pH in the calcite residue may be accomplished by dewatering followed by dilution, or by the addition of a small amount of inorganic acid material, or by a combination of the two methods. The dewatering may be done in a centrifugal separator or a thickener and the alkaline water returned for further use in the first magnesia separation. The introduction of carbonic acid or sulphuric acid to the pulp, probably after at least partial dewatering, will produce any desired degree of pH change. Preferably I reduce the pH value to a point within the range 7-8. In most cases good operating practice will indicate that a fairly efficient dewatering should be carried out followed by dilution with fresh water whereupon relatively small amounts of acid will be required to give the desired reduction in alkalinity.

It will be apparent to those skilled in the art that the raw materials to be treated must be crushed and ground to whatever degree is required to release effectively the mineral bonds between the various components. I have found that on a number of materials at wet grind so regulated as to produce a product which is approximately minus 150 mesh (Tyler) is suitable. In other instances, of course, it will be found that other degrees of grinding are desirable.

It is to be understood that the term "calcite" as used herein applies generally to naturally occurring calcium carbonate as found, for example, in various cement rocks, and does not apply to any particular crystalline form.

The following example will illustrate a specific application of the invention when applied to a material rich in calcite but containing an undesirable proportion of magnesite. The initial material containing 75.8% $CaCO_3$ and 19.8% $MgCO_3$, was ground to a fineness of about minus 150 mesh, following which it was subjected to a size classification in a continuous centrifuge to make a separation at about 10 microns.

800 grams of the coarse centrifuge product suspended in water containing 150 milligrams CaO per liter, in the form of calcium bicarbonate, were placed in a three liter laboratory flotation cell and 3 grams of Portland cement (7.5 lbs. per ton) were added. As collecting and frothing agents, a saponified "waste oil" and a resin acid soap were added in proportions amounting to 0.15 lb. per ton and 0.075 lb. per ton respectively. The waste oil was produced in the refining of animal and vegetable oils during the production of high grade fatty acids. The magnesite froth amounted to 22.9% by weight containing 23.7% $CaCO_3$ and 72.1% $MgCO_3$. The tailing which was 77.1% of the weight contained 91.4% $CaCO_3$ and 4.3% $MgCO_3$. Such an improved product would be suitable for cement making. In a repetition of the above described procedure except that 0.25 lb. per ton of resin acid soap was used as the collector instead of the two soaps, approximately the same metallurgical results were obtained.

I claim:

1. A method for beneficiating by froth flotation a material containing calcium carbonate and a substantially less but an undesired high proportion of a magnesium carbonate mineral of the class consisting of magnesite and dolomite, which comprises subjecting the material in the form of an aqueous pulp having a pH value in excess of 8.5, and in the presence of at least one hydraulic calcium silicate, to the action of at least one anionic active collector selected from the class consisting of the higher fatty acids, resinous acids, and alkali metal soaps thereof, aerating the pulp, and removing the magnesium carbonate mineral as a froth concentrate.

2. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, subjecting the material above about 10 microns in size in the form of an aqueous pulp having a pH value in excess of 8.5, and in the presence of at least one hydraulic calcium silicate, to the action of at least one anionic active collector selected from the class consisting of the higher fatty acids, resinous acids, and alkali metal soaps thereof, aerating the pulp, and removing the magnesium carbonate mineral as a froth concentrate.

3. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, increasing the alkalinity of an aqueous pulp of the material above about 10 microns in size to a pH value in excess of 8.5 by the addition of at least one alkaline material selected from the class consisting of the oxides, hydroxides, and soluble bicarbonates of the alkali and alkaline earth metals, subjecting the alkalized pulp of said material in the presence of at least one hydraulic calcium silicate, to the action of at least one anionic active collector selected from the class consisting of the higher fatty acids, resinous acids, and alkali metal soaps thereof, aerating the pulp, and removing the magnesium carbonate mineral as a froth concentrate.

4. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, increasing the alkalinity of an aqueous pulp of the material above about 10 microns in size to a pH value in excess of 8.5 by the addition of at least one alkaline material selected from the class consisting of the oxides, hydroxides, and soluble bicarbonates of the alkali and alkaline earth metals, subjecting the alkalized pulp of said material in the presence of a small proportion of Portland cement to the action of at least one anionic active collector selected from the class consisting of the higher fatty acids, resinous acids, and alkali metal soaps thereof, aerating the pulp, and removing the magnesium carbonate mineral as a froth concentrate.

5. A method for beneficiating by froth flotation a material containing calcium carbonate and a substantially less but an undesired high proportion of a magnesium carbonate mineral of the class consisting of magnesite and dolomite, which comprises separating from the material a major portion of the particles having a size below about 10 microns, increasing the alkalinity of an aqueous pulp of the material above about 10 microns in size to a pH value in excess of 8.5 by the addition of at least one alkaline material selected from the class consisting of the oxides, hydroxides, and soluble bicarbonates of the alkali and alkaline earth metals, subjecting the alkalized pulp of said material in the presence of a small proportion of Portland cement to the action of at least one anionic active collector selected from the class consisting of the higher fatty acids, resinous acids, and alkali metal soaps thereof, aerating the pulp, and removing the magnesium carbonate mineral as a froth concentrate.

6. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, adding to an aqueous pulp of the material above about 10 microns in size a small proportion of Portland cement to produce therein an alkalinity in excess of a pH value of 8.5, and subjecting the alkalized pulp of said material to the action of at least one higher fatty acid soap, aerating the pulp and removing the magnesium carbonate mineral as a froth concentrate.

7. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, adding to an aqueous pulp of the material above about 10 microns in size a small proportion of Portland cement to produce therein an alkalinity in excess of a pH value of 8.5, and subjecting the alkalized pulp of said material to the action of at least one resinous acid soap, aerating the pulp and removing the magnesium carbonate mineral as a froth concentrate.

8. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, subjecting the material above about 10 microns in size in the form of an aqueous pulp having a pH value in excess of 8.5, and in the presence of at least one hydraulic calcium silicate, to the action of at least one anionic active collector selected from the class consisting of the higher fatty acids, resinous acids, and alkali metal soaps thereof, aerating the pulp, removing the magnesium carbonate mineral as a froth concentrate, reducing the pH of the residual pulp to a value below 8.5, and froth floating the calcium carbonate therefrom by means of an anionic active calcium carbonate collector.

9. A method for beneficiating by froth flotation a material containing calcium carbonate and a substantially less but an undesired high proportion of a magnesium carbonate mineral of the class consisting of magnesite and dolomite, which comprises separating from the material a fine fraction containing a major proportion of all the particles of the material having a size below about 10 microns, subjecting the material above about 10 microns in size in the form of an aqueous pulp having a pH value in excess of 8.5, and in the presence of at least one hydraulic calcium silicate, to the action of at least one anionic active collector selected from the class consisting of the higher fatty acids, resinous acids, and alkali metal soaps thereof, aerating the pulp, removing the magnesium carbonate mineral as a froth concentrate, reducing the pH of the residual pulp to a value below 8.5 by replacing a substantial proportion of the alkaline water with fresh water and adding a mineral acid, and froth floating the calcium carbonate therefrom by means of an anionic active calcium carbonate collector.

10. A method for beneficiating by froth flotation a material containing calcium carbonate, substantially less but an undesired high proportion of a magnesium carbonate mineral of the class consisting of magnesite and dolomite and containing at least one siliceous material in undesired excess, which comprises separating from the material a fine fraction containing a major proportion of all the particles of the material having a size below about 10 microns, subjecting the material above about 10 microns in size in the form of an aqueous pulp having a pH value in excess of 8.5, and in the presence of at least one hydraulic calcium silicate, to the action of at least one anionic active collector selected from the class consisting of the higher fatty acids, resinous acids, and alkali metal soaps thereof, aerating the pulp, removing the magnesium carbonate mineral as a froth concentrate, and separating from the residual enriched calcium carbonate pulp at least a part of the siliceous material contained therein by means of a cationic collector, having a differential selective collecting capacity for siliceous minerals and calcite.

11. In a method of beneficiating, for the preparation of an ultimate cement raw material mixture, cement raw materials which contain calcium carbonate, and magnesium carbonate in the form of a mineral of the class consisting of magnesite and dolomite, with the magnesium carbonate being present in an amount substantially less than the calcium carbonate but in excess of that desired in the ultimate mixture, the improvement which comprises subjecting the raw material to a size classification to remove a major portion of the particles containing a major proportion of all the particles of the material having a size below about 10 microns, adding to an aqueous pulp of the material above about 10 microns in size a small proportion of Portland cement to produce therein an alkalinity in excess of a pH value of 8.5, and subjecting the alkalized pulp of said material to a froth flotation operation in which the excess magnesium carbonate is removed as a concentrate by means of at least one anionic active collector selected from the class consisting of the higher fatty acids, resinous acids, and soaps thereof.

12. In a method of beneficiating, for the preparation of an ultimate raw material mixture, cement raw materials which contain calcium carbonate, and magnesium carbonate in the form of a mineral of the class consisting of magnesite and dolomite, with the magnesium carbonate being present in an amount substantially less than the calcium carbonate but in excess of that desired in the ultimate mixture, and including an amount of at least one siliceous mineral in excess of that desired in the ultimate mixture, the improvement which comprises subjecting the raw material to a size classification to remove a major portion of the particles containing a major proportion of all the particles of the material having a size below about 10 microns, adding to an aqueous pulp of the material above about 10 microns in size a small proportion of Portland cement to produce therein an alkalinity in excess of a pH value of 8.5, subjecting the alkalized pulp of said material to a froth flotation operation in which the excess magnesium carbonate is removed as a concentrate by means of at least one anionic active collector selected from the class consisting of the higher fatty acids, resinous acids, and soaps thereof, and separating from the residual enriched calcium carbonate pulp at least a part of the siliceous material contained therein by means of a cationic collector, having a differential selective collecting capacity for siliceous minerals and calcite.

THORBJORN HEILMANN.

REFERENCES CITED

The following references are of record in the file of this patent:

UNITED STATES PATENTS

| Number | Name | Date |
|---|---|---|
| 2,208,143 | Weinig | July 16, 1940 |

OTHER REFERENCES

Taggart, Handbook of Mineral Dressing, Section 12, pages 18, 19, 25, 26, 27.